United States Patent
Ritchey et al.

(10) Patent No.: US 6,663,072 B1
(45) Date of Patent: Dec. 16, 2003

(54) LAP STABILIZATION DEVICE

(76) Inventors: Eugene B. Ritchey, 13821 Sable Blvd., Brighton, CO (US) 80601; Craig E. Ritchey, 14031 Sable Blvd., Brighton, CO (US) 80601

(*) Notice: Subject to any disclaimer, the term of this patent is extended or adjusted under 35 U.S.C. 154(b) by 0 days.

(21) Appl. No.: 09/545,623

(22) Filed: Apr. 7, 2000

(51) Int. Cl.[7] .................................................. A47B 97/04
(52) U.S. Cl. .................................. 248/444; 248/346.03
(58) Field of Search .............................. 248/444, 460, 248/346.03, 346.04, 346.01, 346.06; 108/43

(56) References Cited

U.S. PATENT DOCUMENTS

| | | | | |
|---|---|---|---|---|
| 1,546,116 A | * | 7/1925 | Bradt | 248/444 X |
| 2,701,173 A | * | 2/1955 | Senior et al. | 311/23 |
| 3,463,438 A | * | 8/1969 | Olson | 248/444 |
| 4,243,249 A | * | 1/1981 | Goss | 281/1 |
| 4,765,583 A | * | 8/1988 | Tenner | 248/444 |
| 4,903,932 A | * | 2/1990 | Stewart, Jr. | 248/444 |
| 5,263,423 A | * | 11/1993 | Anderson | 108/43 |
| 5,593,128 A | * | 1/1997 | Odom et al. | 248/346.01 |
| 5,682,993 A | * | 11/1997 | Song | 206/320 |
| 5,713,548 A | * | 2/1998 | Boyer et al. | 248/205.2 |
| 5,813,748 A | * | 9/1998 | Maxymych | 262/154 |
| 5,826,770 A | * | 10/1998 | Chuang | 224/607 |
| 5,839,553 A | * | 11/1998 | Dorsam | 190/109 |
| 5,871,094 A | * | 2/1999 | Leibowitz | 206/320 |
| 5,881,932 A | * | 3/1999 | Wadden | 224/153 |
| 5,937,765 A | * | 8/1999 | Stirling | 108/43 |
| 6,017,062 A | * | 1/2000 | White | 281/29 |
| 6,035,789 A | * | 3/2000 | Ben-Haim | 108/43 |
| 6,062,357 A | * | 5/2000 | Bogert | 190/18 |
| 6,101,086 A | * | 8/2000 | Kim et al. | 361/683 |
| 6,109,434 A | * | 8/2000 | Howard, Jr. | 206/320 |
| 6,116,696 A | * | 9/2000 | Widman et al. | 297/483 |
| RE37,239 E | * | 6/2001 | Eisenberg | 108/43 |
| 6,269,948 B1 | * | 8/2001 | Jackson | 206/320 |
| 6,353,530 B1 | * | 3/2002 | Zarek et al. | 361/683 |
| 6,496,360 B1 | * | 12/2002 | Cordes et al. | 361/683 |
| 6,529,369 B1 | * | 3/2003 | Zarek et al. | 361/680 |

* cited by examiner

*Primary Examiner*—Ramon O. Ramirez
*Assistant Examiner*—A. Joseph Wujciak
(74) *Attorney, Agent, or Firm*—Sheridan Ross P.C.

(57) ABSTRACT

A lap stabilization device includes a support tray, and at least one strap which is routed around and removably secured to the legs of a seated person to provide a stabilized work surface. The stabilized work surface can be used to secure a laptop computer, or any other object which requires stabilization on the lap of the person. In the first embodiment, the lap stabilization device comprises the support tray and at least one strap. In the second embodiment, the lap stabilization device can further include a lid thereby providing storage capacity for a laptop computer in the form of a laptop computer carrying case. Various structures are disclosed for attaching the stabilization device to the lap of the user. A retracting mechanism can be used to store and to selectively feed a desired length of securing strap for securing the stabilization device to the lap of the user.

12 Claims, 1 Drawing Sheet

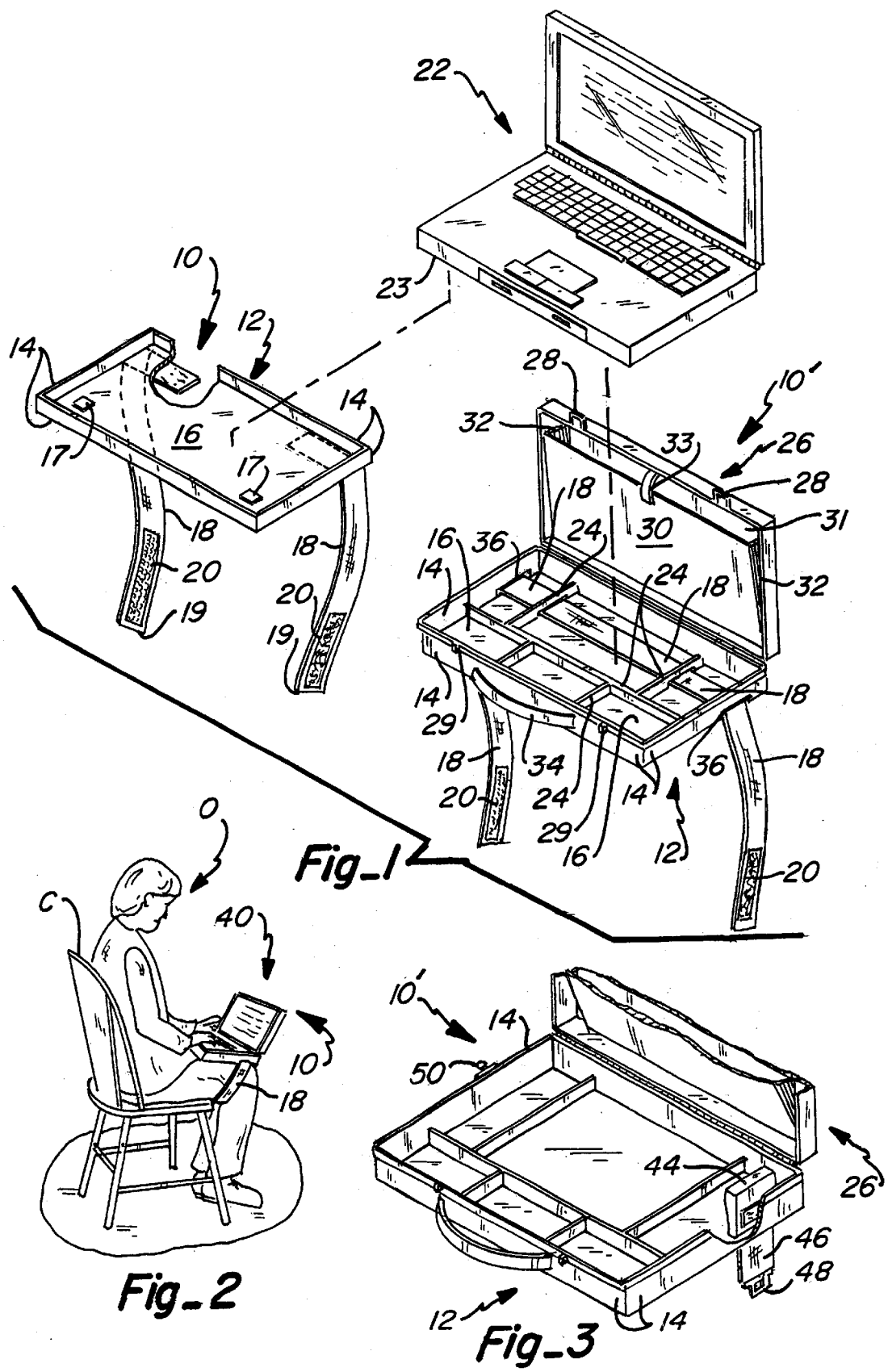

LAP STABILIZATION DEVICE

TECHNICAL FIELD

This invention relates to a lap stabilization device and, more particularly, to a lap stabilization device secured to a seated user's lap which supports and steadies a laptop computer so that the user more easily can perform keyboard functions on the laptop computer.

BACKGROUND ART

Laptop computers continue to become more popular, and in many cases have replaced the desktop computer. Business travelers, and all other persons who have the need for a portable or mobile personal computer utilize laptop computers because of their relative ease in transport, storage, and general accessibility in all environments and locations. Typically, a laptop computer includes a computer case as an accessory. The computer case may have a soft cover, or may have a more stiff or hard cover like a piece of luggage. Because of the time spent by business travelers in airports, or other locations where there are no readily accessible desktop surfaces, such a person may have the need to perform keyboard operations on the computer, or otherwise access functions on the computer to check electronic mail or the like. In such circumstances, the user is typically seated in a chair, and the laptop computer case rests on the lap. Especially for extended periods of time during which the user may perform keyboard operations or otherwise have the need to access the computer, the computer case with the laptop computer inside, or the laptop computer removed from the case becomes very difficult to stabilize on a person's lap. Furthermore, depending upon the particular build of the user, it may become quite uncomfortable over a long period of time to keep the knees closely situated to one another in order that the laptop computer can be secured on a person's lap. Accordingly, there is a need for a simple yet effective device which helps to secure the laptop computer on a person's lap during keyboard operations or the like.

SUMMARY OF THE INVENTION

The lap stabilization device of this invention is intended to overcome the basic problems with supporting a laptop computer on the lap of a user by providing means to secure the laptop computer to the person's lap and to otherwise provide a steady work surface on the lap. In its simplest form, the device of this invention includes a support tray on which to rest the laptop computer, and one or more securing straps which connect to the support tray at one end, and have the free ends available for attachment to the user's legs. In the first preferred embodiment, the support tray is simply a substantially planar member which may be of a desired size, preferably somewhat larger than the base of the laptop computer being used. The support tray may include one or more upstanding edges which help to prevent the laptop computer from slipping off the surface of the support tray. Alternatively, or in combination therewith, the support tray may include a plurality of non-slip tabs or gripping elements which are secured to the upper surface of the support tray to prevent slippage of the laptop computer when placed thereon.

In the first embodiment, a pair of straps are used to secure the device to the lap of the user. The straps may include hook and pile material (such as Velcro®) for securing the straps to one another.

In a second embodiment, the laptop stabilization device of this invention is in the form of a laptop computer case which includes a support tray as with the first embodiment, but also includes a hinged lid so that the laptop computer may be enclosed within the computer case when not in use. In the second embodiment, a plurality of dividers may be formed on the support tray thus providing storage compartments. The support tray of the second embodiment also includes one or more securing straps for securing the device to the lap of the user as with the first embodiment.

In a modification to the first or second embodiments, in lieu of free hanging straps, a retracting mechanism may be used to retract the securing strap(s) when not in use. The retractor may be mounted on either the exterior or interior edge or surface of the stabilization device as desired.

Additional advantage of this invention will become apparent from the description which follows, taken in conjunction with the accompanying drawings.

BRIEF DESCRIPTION OF DRAWINGS

FIG. 1 includes a fragmentary perspective view of a first embodiment of the lap stabilization device of this invention, and a perspective view of a second embodiment of the device of this invention, along with a standard laptop computer which may be used in conjunction with each of the embodiments;

FIG. 2 a perspective view of the laptop stabilization device of this invention secured to the lap of an operator or user and FIG. 3 fragmentary perspective view of a modification to the second embodiment, which may also be incorporated as a modification to the first embodiment.

DETAILED DESCRIPTION OF THE INVENTION

FIG. 1 illustrates the laptop stabilization device 10 of this invention in the first embodiment. As shown, the device 10 includes a support tray 12 which may rest upon the lap of a user, as shown in FIG. 2. The support tray 12 may include one or more upstanding edges 14 which help to confine and stabilize a laptop computer 22 which may rest on the base 16 of support tray 12. Alternatively, or in combination with the upstanding edges 14, a plurality of non-slip tabs or gripping elements 17 may be secured as by adhesive to the upper surface of base 16 to help prevent slippage of laptop computer 22 placed thereon. One or more securing straps 18 attach to the device 10 in order that the device 10 can be secured to a user or operator. In FIG. 1, a pair of securing straps 18 are shown which are secured as by adhesive or the like to the lower surface of base 16. Other means may be used to secure the straps to the support tray 12 as well known by those skilled in the art. In operation, laptop computer 22 is secured by placing the base section 23 on the upper surface of base 16. The user or operator then extends the straps 18 around and under the legs, and then connects the straps together as by hook and pile material 20 which is secured to the free ends 19 of the straps 18. In this position, stabilization device 10 is secured to the lap and will not slip or otherwise move without some considerable effort. Accordingly, the operator O seated in a chair C may conduct keyboard operations, or otherwise manipulate the laptop computer 22 as necessary without the discomfort of maintaining the legs at a stiff and closed position to support the laptop computer. Because the legs of the user can be more relaxed, this also is conducive to better concentration for manipulating the laptop computer. Additionally, if the operator O decides to cease the keyboard operations, the operator/user may still have the laptop computer secured to the lap without fear of the laptop computer falling off and being damaged. When the operator must move from the seated position, the straps are simply disconnected, and the stabilization device 10 may be stored within the accompanying laptop computer case (not shown). Because of the conforming shape of the stabilization device 10, it easily fits within the laptop computer case.

FIG. 1 also illustrates a second preferred embodiment, shown as laptop stabilization 10'. For this embodiment, stabilization device 10' can be characterized as a laptop computer carrying case. As shown, the stabilization device 10' also includes the support tray 12, a plurality of upstanding edges 14, a base 16, and securing straps 18. However, the stabilization device 10' further includes a lid 26 which is hinged to one of the upstanding edges 14. In this manner, the lid 26 in conjunction with the support tray 12 forms a carrying case. The lid 26 may include, as desired, a pair of locks/fasteners 28 which enable the device to be closed and locked when not in use. The pair of locks/fasteners 28 secure to opposing fastening latches 29, as well understood by those skilled in the art. A plurality of dividers 24 may form a number of storage compartments above the base 16. In order to adequately secure the laptop computer base section 23 within the device 10' and to accommodate the storage compartments formed by the plurality of dividers 24, the upstanding edges 14 are increased in height. An upper storage compartment may also be formed by a lid storage flap 30 which is in the form of a continuous semi-flexible piece of material which extends adjacent the inner surface 31 of lid 26, and connects thereto along edge 32. When not in use, the pair of straps 18 shown in the lap stabilization 10' may be stored within the device 10 by pulling the straps back through strap openings 36 formed on the corresponding side edges 14, and stowing the straps 18 within the adjacent compartments formed by dividers 24. In addition to fasteners 28, the device 10' also may come equipped with a standard closing clasp 33, and a carrying handle 34, as shown. When an operator has a need for using the laptop computer while in a seated position, the lid 26 is opened, and the securing straps 18 are fed back through openings 36. Then, the straps 18 are secured under the legs of the user in the manner as shown in FIG. 1.

FIG. 3 illustrates a modification to the second embodiment wherein single strap 36 is used in conjunction with a retracting mechanism 44. The retracting mechanism 44 can be similar to the retracting mechanism which is used for vehicle seat belts. The purpose of the retractor is to store a length of strap 46 therein, and allowing a desired length of strap 46 to be fed by a user pulling on the exposed portion of the strap. When tension is released on the end of the strap, the strap is allowed to retract back within the retracting mechanism 44. As also shown, the exposed end of the strap 46 includes a buckle 48 which may be secured to a latch/hook 50 which is attached to an opposite end of the stabilization device 10'. Thus, only one strap is required which is retractably stored within the retracting mechanism 44. Although the retractor 44 has been illustrated with the second embodiment, it shall be understood that the lap stabilization device 10 can also incorporate retractor 44 in lieu of the pair of straps 18. It should be further understood that, in lieu of a pair of straps for both the first and second embodiments, a single strap could be used, without the retractor 44, which attaches directly to the support tray 12, and incorporates the use of a buckle 48 and a latch or hook 50 which is attached to an opposing end of the lap stabilization device.

By the foregoing, a very simple effective device is provided for securing a laptop computer to the lap of a user/operator. Although this invention specifically contemplates the stabilization of a laptop computer, the device of this invention has other intended uses by providing a stabilized work surface or work area on the lap of a user. Therefore, a user/operator could not only stabilize and hold a laptop computer, but also could use the lap stabilization device to write on, or to conduct any other type of activity which requires a relatively steady and firm surface on the lap of a user. Even such simple activities as reading a magazine or book can be enhanced by the use of the lap stabilization device which allows the book or magazine to be placed thereon, without having to deal with the inherently uneven and unsteady surface created by the lap of a user.

This invention has been described in detail with reference to particular embodiments thereof, but it will be understood that various other modifications can be effected within the spirit and scope of this invention.

What is claimed is:

1. A method of securing a stabilization device to the lap of a seated person thereby creating a stabilized work surface for a laptop computer, said method comprising the step of:

providing a substantially planar base surface having opposing ends, and a lid rotatably connected to said planar base surface;

providing at least one strap connected to said substantially planar base at one of said opposing ends;

placing a person in a seated position;

placing the substantially planar base on the lap of the seated person;

placing the laptop computer on the planar base;

routing the strap around the legs of the person so that the strap extends between the opposing ends;

securing the strap to the legs of the person; and maintaining the strap in its secured position to the legs of the person by use of a retracting mechanism which retractably stores and selectively feeds a desired length of the strap.

2. A method, as claimed in claim 1, wherein:

said planar base surface further includes at least one upstanding edge connected to said planar base to prevent slippage of the laptop computer.

3. A method, as claimed in claim 1, wherein:

said planar base surface further includes a plurality of dividers mounted thereon, thereby forming compartments for storage.

4. A method, as claimed in claim 1, wherein:

said lid further includes a storage flap connected thereto forming a compartment for storage between said lid and said storage flap.

5. In combination, a laptop computer and a laptop computer stabilization device, said combination comprising:

a laptop computer;

a stabilization device including a support tray with a substantially planar base and opposing ends;

a strap connected to said support tray at one of said opposing ends, said strap having a free end to engage the legs of the person while seated and said strap extending between said opposing ends;

a retracting mechanism mounted to said support tray for retractably storing, and selectively feeding a desired length of said strap; and a lid rotatably connected to said support tray.

6. The combination, as claimed in claim 5, further including:

at least one upstanding edge connected to said planar base of said support tray to prevent slippage of said laptop computer mounted on said planar base.

7. The combination, as claimed in claim 5, wherein:
said strap includes a pair of straps connected to opposing ends of said stabilization device, and said pair of straps each includes means for attaching one strap to the other of said pair of straps.

8. The combination, as claimed in claim 5, further including: a plurality of dividers mounted to said planar base thereby forming compartments for storage.

9. The combination, as claimed in claim 5, wherein:
said lid further includes a storage flap connected thereto forming a compartment for storage between said lid and said storage flap.

10. In combination, a laptop computer and a laptop computer stabilization device, said combination comprising:
a laptop computer;
a stabilization device including a support tray with a substantially planar base and opposing ends;
a strap connected to said support tray at one of said opposing ends, said strap having a free end to engage the legs of the person while seated and said strap extending between said opposing ends;
a retracting mechanism mounted to said support tray for retractably storing, and selectively feeding a desired length of said strap;
a buckle attached to said free end of said strap; and
a hook attached to an end of said planar base opposite the end to which said strap is attached.

11. A method of securing a stabilization device to the lap of a seated person thereby creating a stabilized work surface for a laptop computer, said method comprising the step of:
providing a substantially planar base surface having opposing ends, and a lid rotatably connected to said planar base surface;
providing at least one strap connected to said substantially planar base at one of said opposing ends;
placing a person in a seated position;
placing the substantially planar base on the lap of the seated person;
placing the laptop computer on the planar base;
routing the strap around the legs of the person so that the strap extends between the opposing ends; and
securing the strap to the legs of the person.

12. In combination, a laptop computer and a laptop computer stabilization device, said combination comprising:
a laptop computer;
a stabilization device including a support tray with a substantially planar base and opposing ends;
a strap connected to said support tray at one of said opposing ends, said strap having a free end to engage the legs of the person while seated and said strap extending between said opposing ends; and
a lid rotatably connected to said support tray.

* * * * *

UNITED STATES PATENT AND TRADEMARK OFFICE
CERTIFICATE OF CORRECTION

PATENT NO. : 6,663,072 B1
DATED : December 16, 2003
INVENTOR(S) : Ritchey

It is certified that error appears in the above-identified patent and that said Letters Patent is hereby corrected as shown below:

Column 6,
Line 6, please insert -- a plurality of dividers mounted to said planar base, -- after "ends".
Line 23, please insert -- , and a plurality of dividers mounted to said planar base -- after "ends".

Signed and Sealed this

Twenty-seventh Day of April, 2004

JON W. DUDAS
*Acting Director of the United States Patent and Trademark Office*